(12) United States Patent
Shekhar et al.

(10) Patent No.: US 11,564,145 B2
(45) Date of Patent: Jan. 24, 2023

(54) SELECTING A NETWORK NODE THAT SUPPORTS A SLICE REQUIREMENT

(71) Applicant: Cisco Technology, Inc., San Jose, CA (US)

(72) Inventors: Ravi Shekhar, Maharastra (IN); Vimal Srivastava, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/308,763

(22) Filed: May 5, 2021

(65) Prior Publication Data

US 2022/0361081 A1 Nov. 10, 2022

(51) Int. Cl.
*H04W 40/04* (2009.01)
*H04W 40/28* (2009.01)
*H04W 40/34* (2009.01)
*H04W 72/04* (2009.01)
*H04W 48/18* (2009.01)
*H04W 72/02* (2009.01)

(52) U.S. Cl.
CPC ........... *H04W 40/04* (2013.01); *H04W 40/28* (2013.01); *H04W 40/34* (2013.01); *H04W 48/18* (2013.01); *H04W 72/02* (2013.01); *H04W 72/048* (2013.01)

(58) Field of Classification Search
CPC ..... H04W 36/08; H04W 36/14; H04W 36/24; H04W 40/04; H04W 40/28; H04W 40/34; H04W 48/18; H04W 72/02; H04W 72/048

See application file for complete search history.

(56) References Cited

U.S. PATENT DOCUMENTS

| | | | |
|---|---|---|---|
| 2017/0245316 A1* | 8/2017 | Salkintzis | H04W 48/16 |
| 2018/0324645 A1* | 11/2018 | Park | H04W 36/08 |
| 2018/0352491 A1 | 12/2018 | Shih et al. | |
| 2019/0349774 A1 | 11/2019 | Lou et al. | |
| 2020/0037234 A1* | 1/2020 | Bulakci | H04W 76/11 |
| 2020/0053643 A1* | 2/2020 | Lee | H04W 8/205 |
| 2020/0275356 A1 | 8/2020 | Forsman et al. | |
| 2020/0358657 A1 | 11/2020 | Xu et al. | |
| 2021/0014781 A1* | 1/2021 | Lanev | H04W 48/18 |
| 2021/0352531 A1* | 11/2021 | Vesely | H04W 28/16 |

FOREIGN PATENT DOCUMENTS

CN 110267327 A * 9/2019 ........... H04W 48/18

* cited by examiner

*Primary Examiner* — Kan Yuen
(74) *Attorney, Agent, or Firm* — Polsinelli

(57) ABSTRACT

The present technology is directed to routing a user equipment (UE) to a network node, for example, a gNB or ng-eNB that supports a slice requirement of the UE. A first network node can receive a Radio Resource Control (RCC) connection request from a UE, and can determine that a slice requirement of the UE is not supported by the first network node. The first network node can further select a second network node that supports the slice requirement of the UE, and route the UE to connect to the second network node.

18 Claims, 8 Drawing Sheets

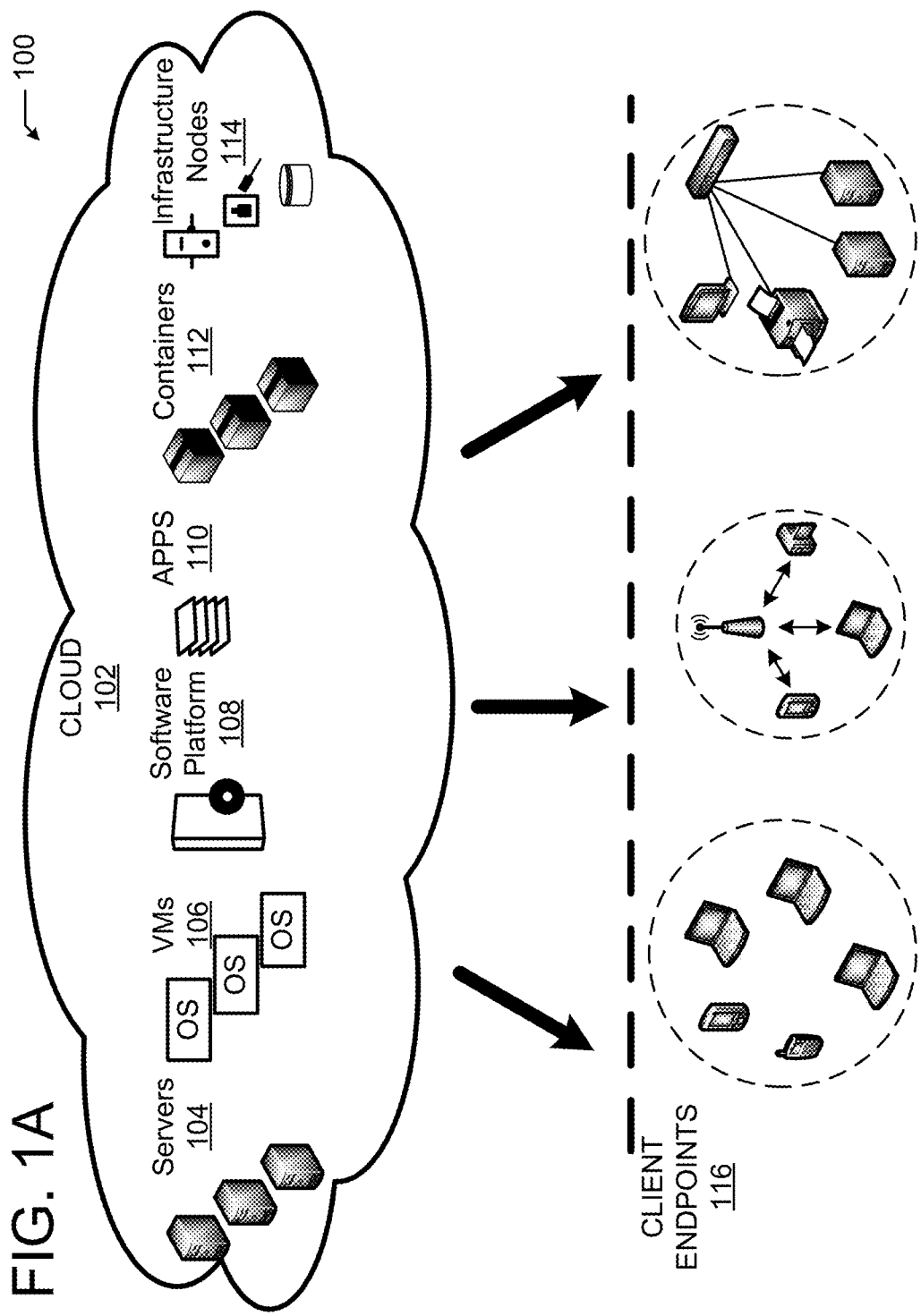

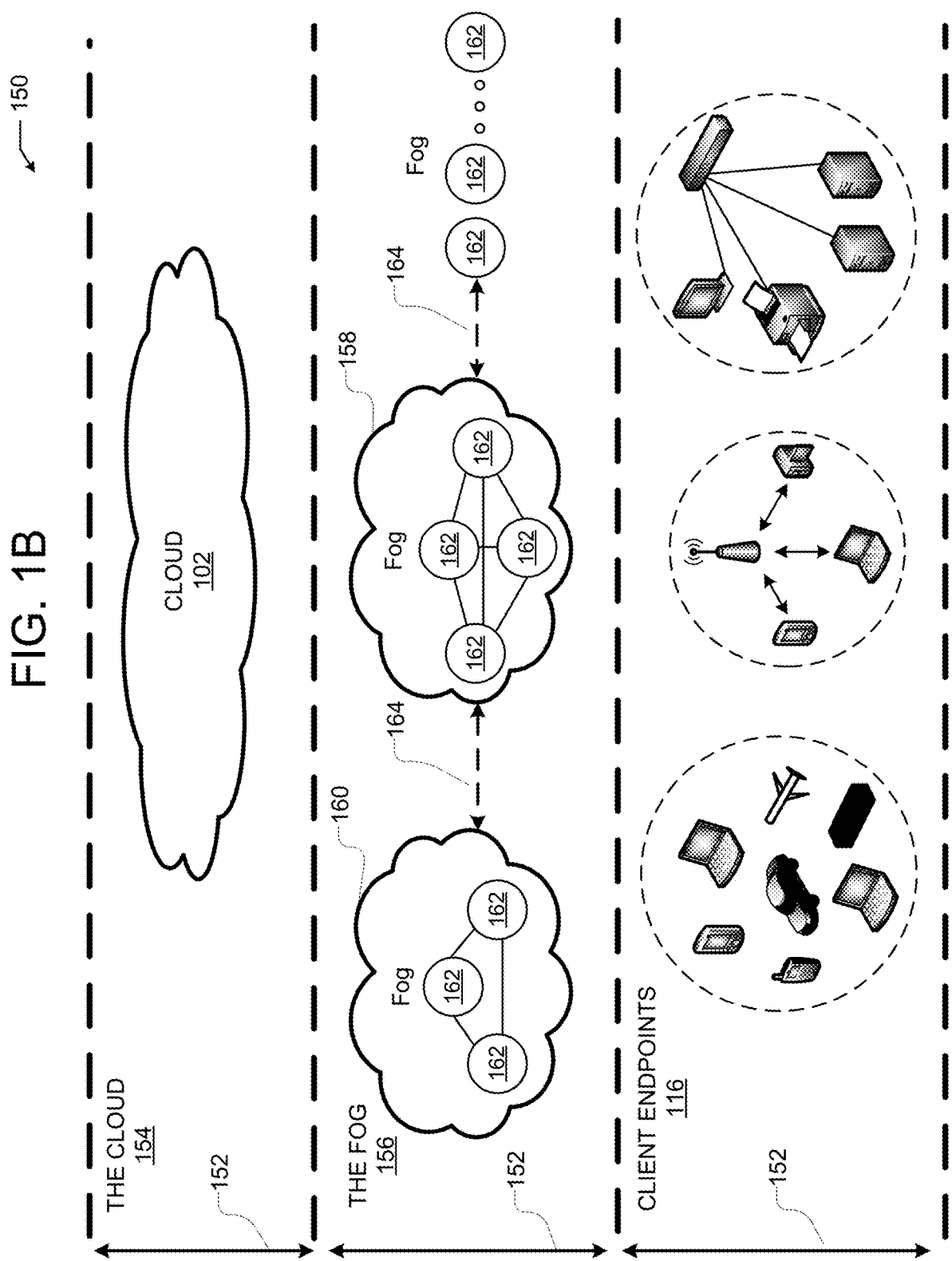

SELECTING A NETWORK NODE THAT SUPPORTS A SLICE REQUIREMENT

DESCRIPTION OF THE RELATED TECHNOLOGY

The present technology pertains to a system and a method that selects a network node that supports a slice requirement of a user equipment, and in particular, the present technology pertains to a system and a method that reconfigures and reselects a network node that supports a slice requirement of a user equipment to route the user equipment to connect to the network node.

BACKGROUND

Current mobile and wireless communication systems have widely adopted a next generation wireless communication system, 5G, or new radio (NR) that provides much higher data rates and lower latency. Due to a super high frequency spectrum used in 5G, a range of the signal propagation is limited. To decrease propagation loss of the signals and increase the transmission distance, a massive deployment of gNBs (5G based stations) and tight interworking of existing eNBs (3GPP/4G base stations) and non-3GPP access networks (e.g. Wi-Fi) need to be implemented. In this dense network constituted by a large number of network nodes (gNBs, ng-eNBs, and non-3GPP), a user equipment (UE) would need to select an appropriate access network node before it connects to 5G Core Network.

BRIEF DESCRIPTION OF THE DRAWINGS

FIG. 1A illustrates an example cloud computing architecture.

FIG. 1B illustrates an example fog computing architecture.

DETAILED DESCRIPTION

Figure 2:
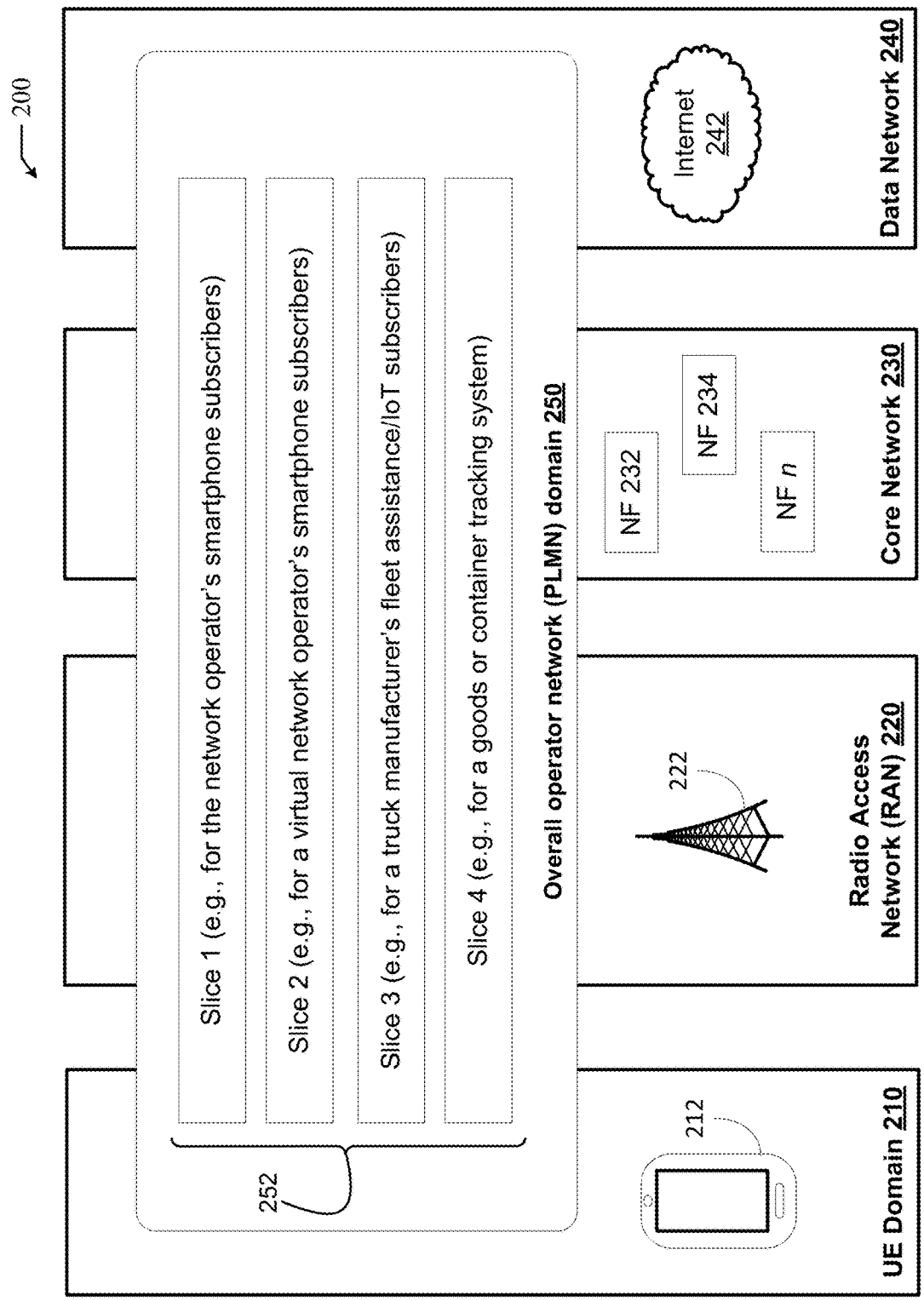
FIG. 2 depicts an exemplary schematic representation of a 5G network environment in which network slicing has been implemented, and in which one or more aspects of the present disclosure may operate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following acronyms are used throughout the present disclosure, provided below for convenience.

3GPP—$3^{rd}$ Generation Partnership Project
5G—$5^{th}$ Generation wireless system
5G NR—5G New Radio
5GC—5G Core Network
AMF—Access and Mobility Management Function
ANR—Automatic Neighbor Relation
eMBB—enhanced Mobile Broadband
MME—Mobility Management Entities
NAS—Non-Access Stratum
NG-RAN—New Generation Radio Access Network
NRT—Neighboring Relationship Table
NSSAI—Network Slice Selection Assistance Information
PLMN—Public Land Mobile Network RAN—Radio Access Network
RRC—Radio Resource Control
UE—User Equipment
UPF—User Plane Function
XnAP—Xn Application Protocol Current mobile and wireless communication systems have widely adopted a next generation wireless communication system, 5G, or new radio (NR) that provides much higher data rates and lower latency. Due to a super high frequency spectrum used in 5G, a range of the signal propagation is limited. To decrease propagation loss of the signals and increase the transmission distance, a massive deployment of gNBs (5G based stations) and tight interworking of existing eNBs (3GPP/4G base stations) and non-3GPP access networks (e.g. Wi-Fi) need to be implemented. In this dense network constituted by a large number of network nodes (gNBs, ng-eNBs, and non-3GPP), a user equipment (UE) would need to select an appropriate access network node before it connects to 5G Core Network.

Network slicing is expected to play a critical role in 5G network because of the multitude of use cases and new services that 5G is capable of supporting. Network slicing is partitioning of a single physical network into multiple virtual networks to offer optimal support for different types of services and for different types of users. By creating separate slices, for example, Mobile Broadband (MBB) slice, Massive IoT slice, or Mission critical IoT slice, a 5G operator can offer tailored solutions to particular customer use cases based on very different transmission characteristics. Network slicing can further provide improved efficiency and performance and enhanced service continuity via more effective roaming across networks. As such, it is imperative for a UE to connect to an access network node that is capable of supporting the UE requested slice.

Currently, a selection of a network node is based on signal strength, public land mobile network (PLMN) identifiers, or operator policy. Among multiple choices of network nodes in the complex network, it is critical for the UE to connect to a network node supporting a slice requested by the UE. With abundant nodes available in the coverage area, it is possible that the UE latches on a network node that does not support the UE service or slice requirement, which can lead to less efficient performance and possible failure of connectivity in the network.

Therefore, there exists a need for selecting a network node that can support a slice requirement of a UE where a large number of nodes including gNBs, eNBs, and non-3GPP access networks coexist. There is also a strong need to reconfigure and reselect a network node so that the UE can be rerouted to the best available network node, which can serve the requested slice of the UE.

The present technology includes systems, methods, and computer-readable media for solving these problems and discrepancies. Specifically, systems, methods, and computer-readable media for selecting a network node that supports a slice requirement of a UE are provided in the present disclosure.

Overview

Methods, systems, and non-transitory computer-readable media are provided for selecting a network node that supports a slice requirement of a user equipment and routing the user equipment to connect to the network node.

The present technology can perform reconfiguration and reselection of a network node, for example, a gNB or ng-eNB that serves a slice requirement of a user equipment (UE) to route the UE to the network node. A first network node can receive a Radio Resource Control (RRC) connection request from the UE and determine that a slice requirement of the UE is not supported by the first network node. Then, the first network node can select a second network node that supports the slice requirement of the UE and route the UE to connect to the second network node.

The first network node can further add a list of slices that are supported by one or more neighboring nodes to a neighboring relationship table. The one or more neighboring nodes include the second network node.

When the first network node selects the second network node that supports the slice requirement of the UE, the first network node can determine that the second network node supports the slice requirement of the UE and send a node addition request to the second network node requesting an authorization to route the UE to the second network node. After receiving the authorization to route the UE to the second network node, the first network node can route the UE to connect to the second network node.

When the first network node selects the second network node that supports the slice requirement of the UE, the first network node can further determine that a plurality of network nodes including the second network node support the slice requirement of the UE, the first network node can employ a selection logic to select the second network node to route the UE.

The RRC connection request can include Network Slice Selection Assistance Information (NSSAI) received from the UE.

Furthermore, the first network node can maintain a neighboring relationship table identifying one or more neighboring nodes and including an attribute to define an area in which a network slice is available.

A system for routing a user equipment (UE) to a network node that supports a slice requirement of the UE can include one or more processors and at least one computer-readable storage medium storing instructions which, when executed by the one or more processors, cause the one or more processors to receive a Radio Resource Control (RRC) connection request from the UE. The one or more processors can also determine that a slice requirement of the UE is not supported by the first network node. The one or more processors can further select a second network node that supports the slice requirement of the UE and route the UE to connect to the second network node.

A non-transitory computer-readable storage medium having stored therein instructions which, when executed by one or more processors, can cause the one or more processors to receive a Radio Resource Control (RRC) connection request from a user equipment (UE), determine that a slice requirement of the UE is not supported by the first network node, select a second network node that supports the slice requirement of the UE, and route the UE to connect to the second network node.

Description

The disclosed technology addresses the need in the art for selecting an appropriate network node that supports a slice requirement of a user equipment. The present technology involves system, methods, and computer-readable media for routing a user equipment to connect to a network node that supports a slice requirement of the user equipment.

Figure 3:
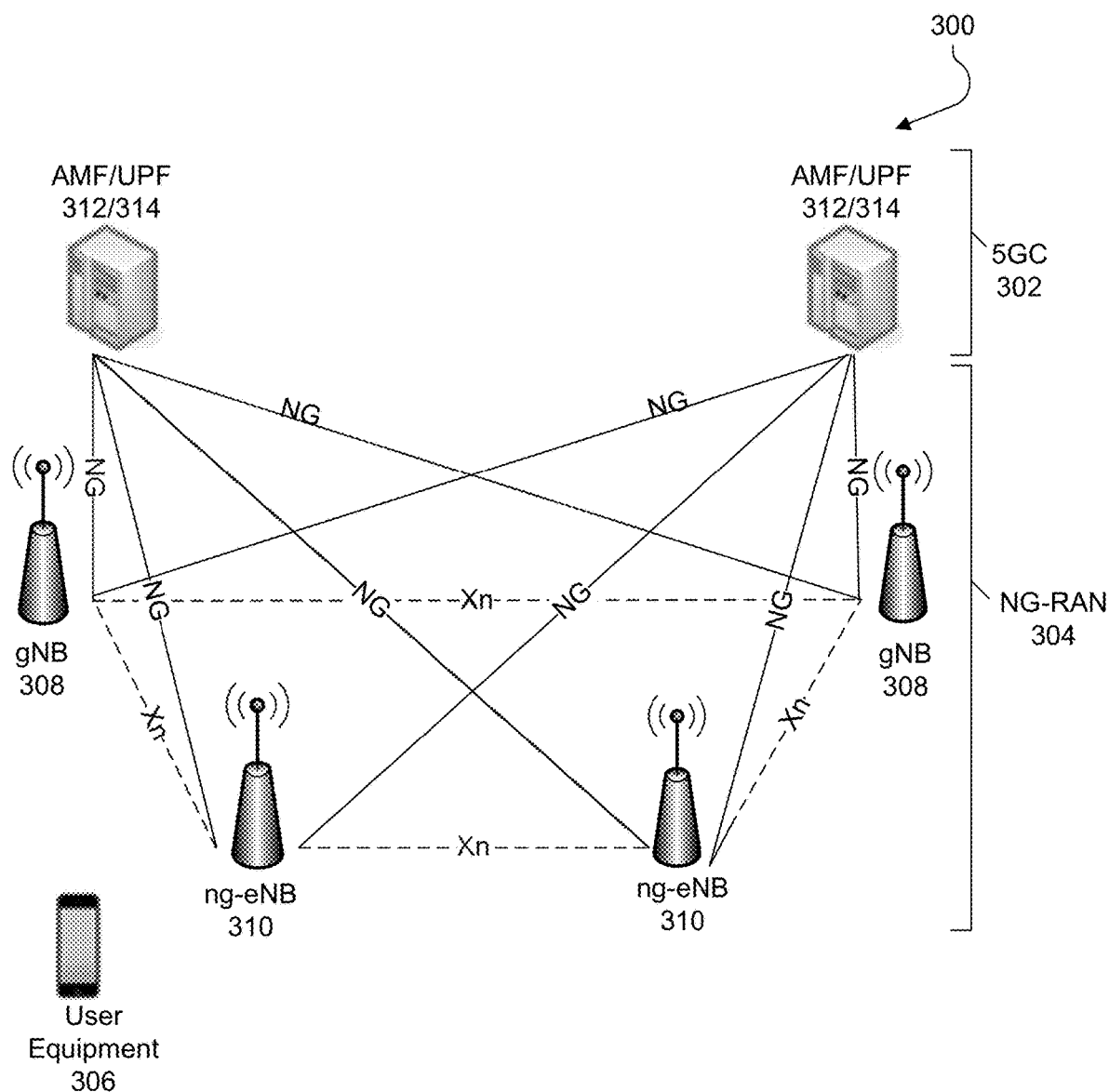
FIG. 3 shows an example next generation radio access network (NG-RAN) architecture.
Figure 4:
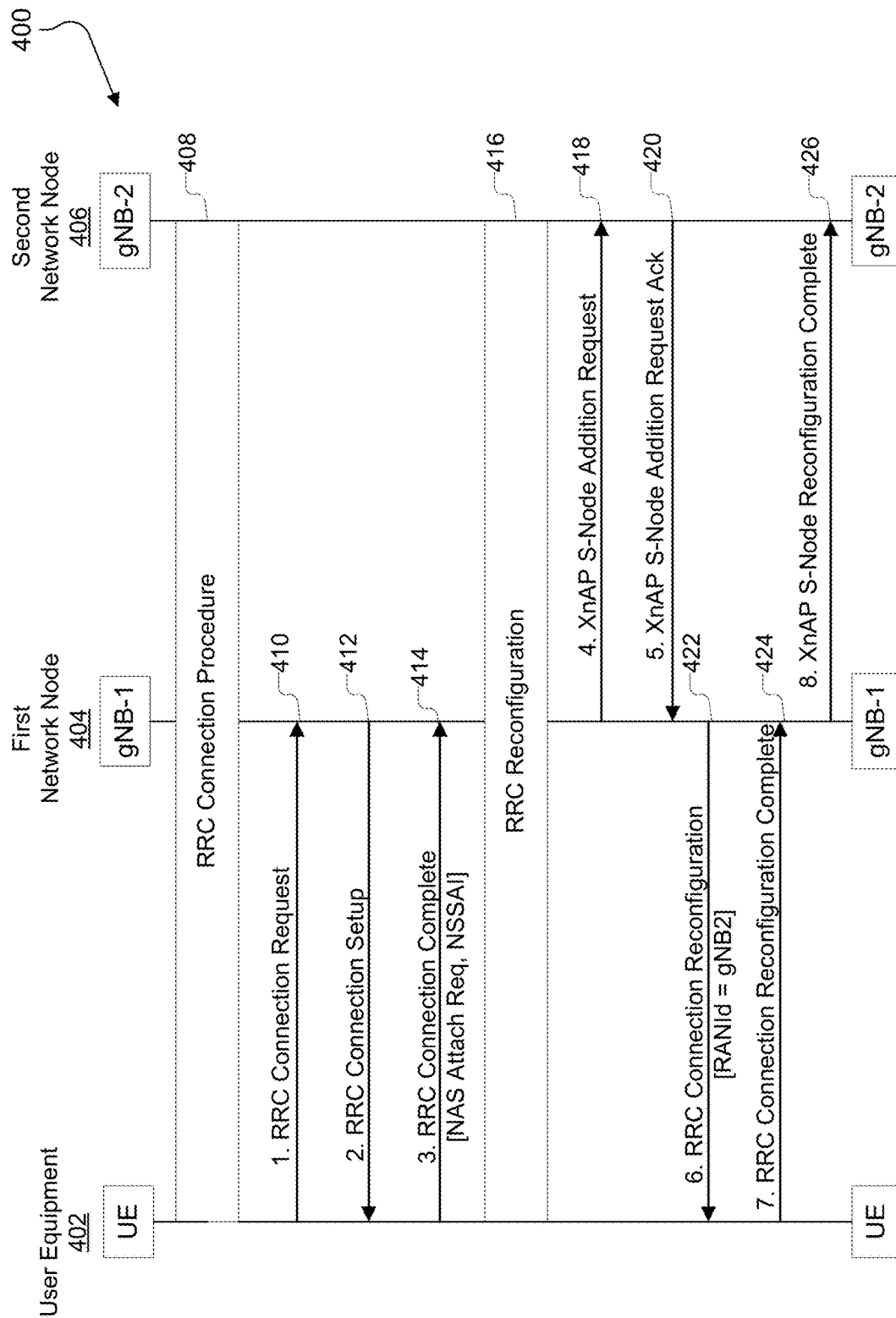
FIG. 4 shows an example connection procedure for routing a user equipment to a network node that supports a slice requirement of the user equipment.
Figure 5:
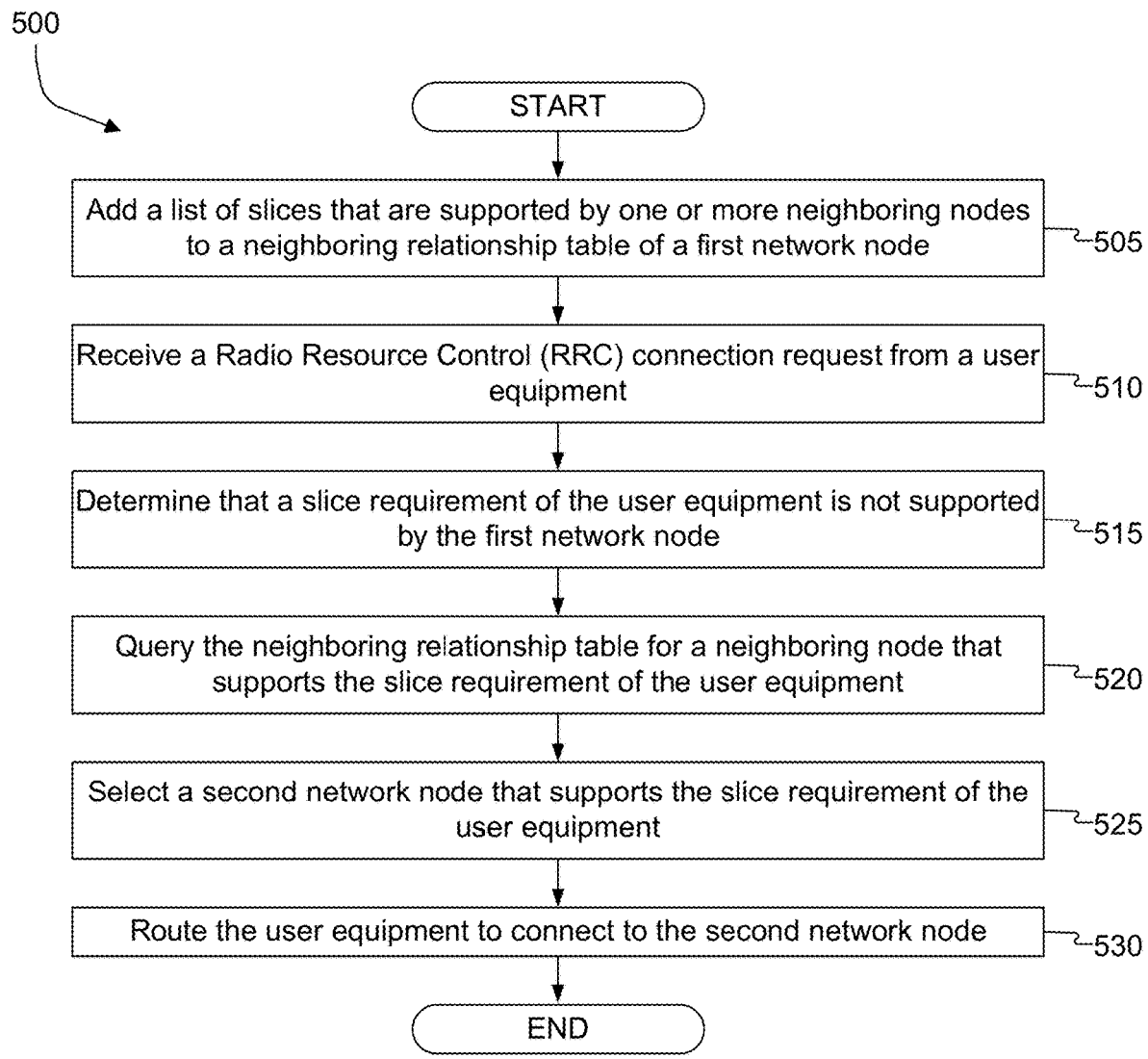
FIG. 5 is a flowchart of a method for routing a user equipment to a network node that supports a slice requirement of the user equipment according to an example of the present disclosure.
Figure 6:
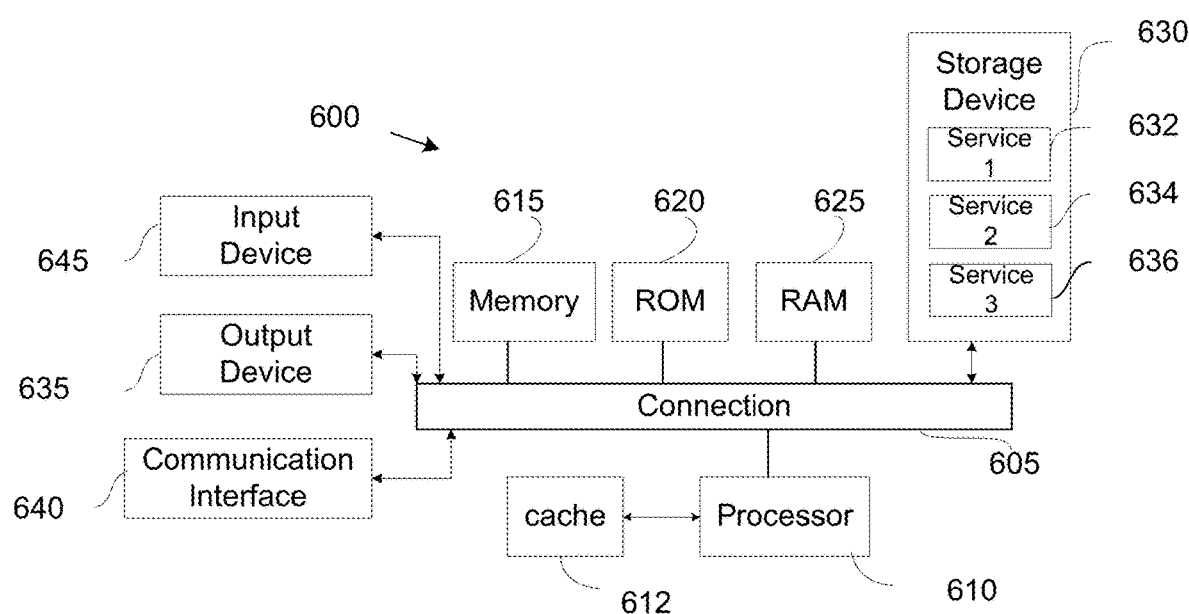
FIG. 6 shows an example of computing system, which can be for example any computing device that can implement components of the system.
Figure 7:
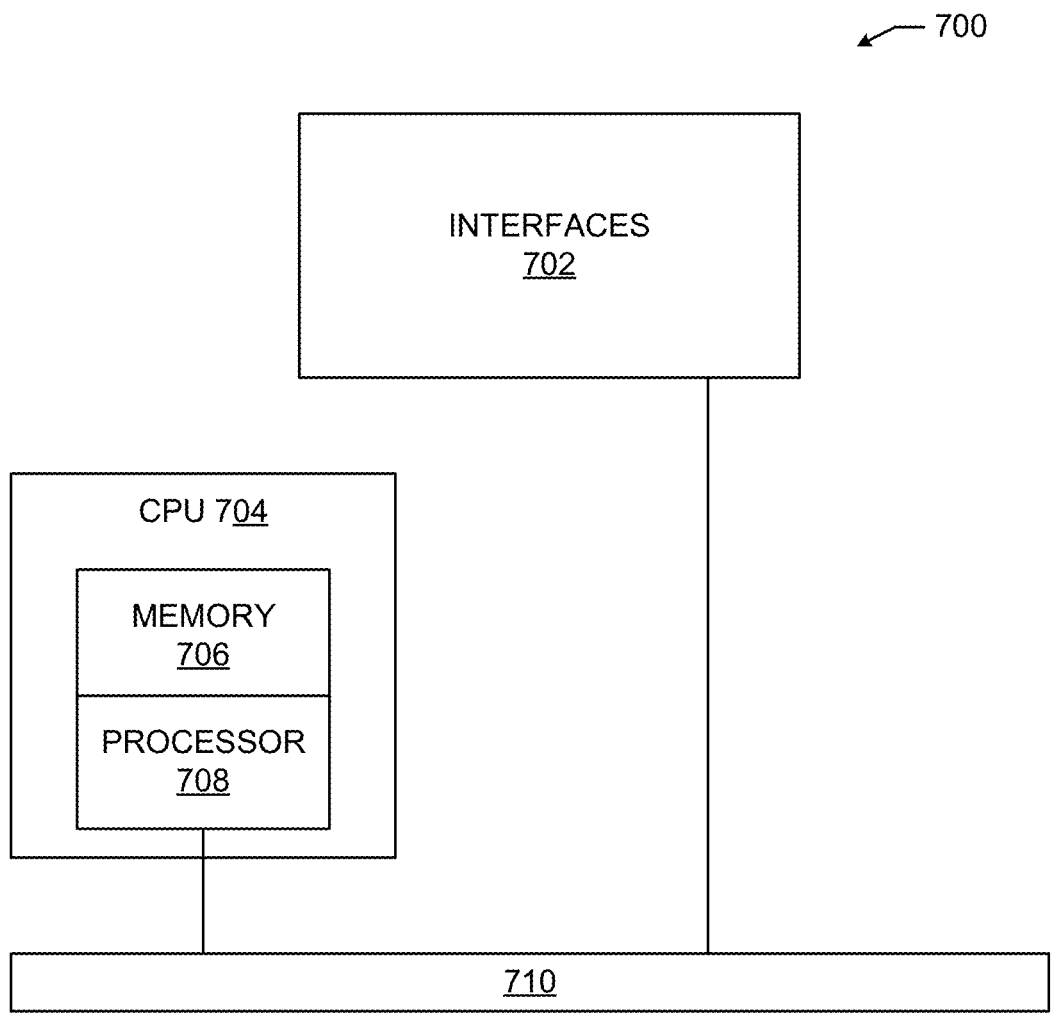
FIG. 7 illustrates an example of network device.

A description of network environments and architectures for network data access and services, as illustrated in FIGS. 1A, 1B, and 2 is first disclosed herein. A description of a next generation radio access network (NG-RAN) architecture constituted by multiple network nodes is shown in FIG. 3. A discussion of systems, methods, and computer-readable medium for routing a user equipment to connect to a network node that supports a slice requirement of the user equipment, as shown in FIGS. 4 and 5, will then follow. The discussion then concludes with a brief description of example devices, as illustrated in FIGS. 6 and 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

FIG. 3 illustrates an example next generation radio access network (NG-RAN) architecture 300. A 5G system consists of 5G access network, 5G core network (5GC) 302, and User Equipment (UE) 306. The 5G access network includes NG-RAN 304 and/or non-3GPP access network (not shown) connecting to 5GC 302. The 5GC 302 includes one or more Access and Mobility Management Function (AMF) 312 and User Plane Function (UPF) 314. The NG-RAN 304 includes one or more NG-RAN node, which can be gNBs 308 and ng-eNBs 310. The gNBs 308 provide 5G NR user plane and control plane protocol terminations towards the UE 306 (i.e., terminal). The ng-eNBs 310 provide LTE/4G user plane and control plane protocol terminations towards the UE 306 (i.e., terminal).

The gNBs 308 and ng-eNBs 310 are interconnected with each other by using an Xn interface. The gNBs 308 and ng-eNBs 310 are connected to the 5GC 302 by using NG interfaces. More specifically, the gNBs 308 and ng-eNBs 310 are connected to the AMF 312 by means of an NG-C interface (i.e., N2 reference point), which is a control plane interface between the 5GC 302 and the NG-RAN 304. The gNBs 308 and ng-eNBs 310 are also connected to the UPF 314 by means of an NG-U interface (i.e., N3 reference point), which is a user plane interface between the 5GC 302 and the NG-RAN 304.

In some embodiments, each gNB 308 or ng-eNB 310, which can be called, in this example, a serving node, maintains a neighboring relationship table (NRT), which is managed by automatic neighbor relation (ANR) function. The NRT identifies an existence of neighboring nodes and shows a neighbor relation between the serving node and the neighboring nodes, thereby facilitating UE's handover to a neighboring node. The need for the manual configuration of a neighbor cell list is minimized as the ANR function automatically generates and updates the NRT by leveraging measurements carried out by UEs (i.e., terminals).

As a UE moves from one coverage area to another, the UE would need to connect to a new node and disconnect from the old node in the previous coverage area without discernable disruption to connectivity. Such handover will be more frequent in 5G network as a large number of network nodes such as gNBs and ng-eNBs coexist in the same coverage area. Handovers require a serving node to have knowledge about the existence of neighboring nodes. As such, use of NRTs identifying the existence of neighboring nodes can help maximize the network throughput and minimize the probability of loss of connectivity and therefore optimize the efficiency of handovers in the network.

FIG. 4 shows a diagram of an example connection procedure 400 for routing a user equipment (UE) to a network node that supports a slice requirement of the UE. The example connection procedure 400 is discussed with reference to UE 402, a first network node gNB-1 404, and a second network node gNB-2 406. While gNBs are used in this example, any network node such as ng-eNB can also be applied.

The connection procedure 400 shown in FIG. 4 can be used to address the problem of routing the UE 402 to connect to a network node, gNB-2 406 in this example, that supports a slice requirement of the UE 402. Specifically, RRC Connection Procedure 408 and RRC Reconfiguration 416 can be used to address this problem. More specifically, the UE 402 can be routed to the gNB-2 406 that supports the slice requirement of the UE 402 when the UE 402 is first connected to the gNB-1 404 that does not support the slice requirement.

As shown in FIG. 4, the UE 402 initiates the RRC connection procedure 408 to establish a connection with a network node. More details on the initial connection procedure to establish a connection with a network node are specified in 3GPP 36.331.

At step 410, the UE 402 transmits an RRC connection request message to a first network node gNB-1 404 to establish an RRC connection with the gNB-1 404. In some embodiments, the RRC connection request message may include information elements such as UE identity and connection establishment cause, which shows the reason why the UE needs to connect to network.

At step 412, in response to the RRC connection request message, the gNB-1 404 transmits an RRC connection setup message to the UE 402. In some embodiments, the RRC connection setup message may include configuration details.

At step 414, the UE 402 transmits an RRC connection setup complete message to the gNB-1 404. The RRC connection complete message may include Network Slice Selection Assistance Information (NSSAI) and Non-Access Stratum (NAS) attach request. The NSSAI specifies the slice or service type requested by the UE 402. For example, a given gNB can be configured to support eMBB slice only while another ng-eNB can be configured to only support Massive IoT slice. The NAS attach request may comprise a variety of information elements including, but not limited to, UE core network capability, protocol discriminator, and security header types. The gNB-1 404 identifies the slice requested by the UE 402 stored in the RRC connection complete message, more specifically, in the NSSAI and determines whether the gNB-1 404 supports the requested slice. If the gNB-1 404 does not support the requested slice, the gNB-1 404 initiates a network node relocation procedure by querying the NRT to locate a network node, which can support the requested slice. In some embodiments, while querying the NRT, a plurality of neighboring network nodes that support the requested slice can be located. If one or more neighboring network nodes support the requested slice, a priority-based, random-based, or round-robin logic can be employed to select a network node for connecting the UE 402.

At step 418, the gNB-1 404 transmits a XnAP S-node addition request message to a second network node gNB-2 406, requesting an authorization to route the UE 402 to the gNB-2 406.

At step 420, in response to the XnAP S-node addition request message, the gNB-2 406 transmits a XnAP S-node addition request acknowledgement message to the gNB-1 404 that approves the authorization to route the UE 402 to the gNB-2 406.

At step 422, when the XnAP S-node addition request acknowledgement message is received, the gNB-1 404 transmits an RRC connection reconfiguration message to the UE 402 indicating that the UE 402 can be connected to the gNB-2 406.

At step 424, in response to the RRC connection reconfiguration message, the UE 402 transmits an RRC connection reconfiguration complete message to the gNB-1 404.

At step 426, the gNB-1 404 transmits a XnAP S-node reconfiguration complete message to the gNB-2 406 so that the UE 402 can latch on the gNB-2 that supports the UE requested slice. In the process of transferring the RRC connection reconfiguration complete message, UE identification information and NSSAI may also be transferred.

FIG. 5 illustrates a flowchart for an example method 500 of routing a user equipment (UE) to a network node that supports a slice requirement of the UE. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

In some embodiments, the method includes adding a list of slices that are supported by one or more neighboring nodes to a neighboring relationship table (NRT) at step 505. For example, the first network node gNB-1 404 illustrated in FIG. 4 may add a list of slices that are supported by one or more neighboring nodes to a NRT. The first network node maintains the NRT identifying one or more neighboring nodes and including an attribute to define an area in which a network slice is available.

The NRT includes not only the information of existence of neighboring nodes but also their supported slice capability. The ANR function residing in the network node manages the NRT. For example, a neighboring detection function of the ANR finds new neighboring nodes and adds them to the NRT. Also, a neighbor removal function of the ANR removes outdated network nodes from the NRT. At step 505, the first network node can add information of supported slices of the neighboring nodes to the NRT. As such, when the first network node does not support the UE requested slice, the first network node may query the NRT to navigate the neighboring nodes, identify the supported slice capability of its neighboring nodes, select a second node that supports the slice requested by the UE, and route the UE to connect to the second network node.

In some embodiments, the first network node can receive a Radio Resource Control (RRC) connection request from the UE at step 510. For example, the first network node gNB-1 404 illustrated in FIG. 4 may receive the RRC connection request from the UE 402. The RRC connection request may include Network Slice Selection Assistance Information (NSSAI) received from the UE. The first network node can identify a slice requirement requested by the UE based on the NSSAI. For example, the first network node gNB-1 404 illustrated in FIG. 4 may receive a RCC connection request message and RRC connection complete message that includes the NSSAI of the UE 402.

In some embodiments, the first network node can determine that a slice requirement of the UE is not supported by the first network node at step 515. For example, the first network node gNB-1 404 illustrated in FIG. 4 may determine that a slice requirement of the UE 402 is not supported by the first network node gNB-1 404.

In some embodiments, the first network node can query a neighboring relationship table (NRT) for a neighboring node that supports the slice requirement of the UE at step 520. For example, the first network node gNB-1 404 illustrated in FIG. 4 may query a NRT for a neighboring node that supports the slice requirement of the UE 402. A result of the query is the second network node, for example, the second network node gNB-2 406 illustrated in FIG. 4. As previously described, the NRT may include identification and slice capability of the neighboring nodes. As such, the NRT may allow the first network node to locate the second network node that serves the UE requested slice.

In some embodiments, the first network node can select a second network node that supports the slice requirement of the UE at step 525. For example, the first network node gNB-1 404 may select the second network node gNB-2 406 that supports the slice requirement of the UE 402.

In another example of the selecting a second network node at step 525, the first network node can determine that the second network node supports the slice requirement of the UE. For example, the first network node gNB-1 404 may determine that the second network node gNB-2 406 supports the slice requirement of the UE 402.

Further, in another example of the selecting a second network node at step 525, the first network node can send a node addition request to the second network node requesting an authorization to route the UE to the second network node. For example, the first network node gNB-1 404 illustrated in FIG. 4 may send a node addition request to the second network node gNB-2 406 to request an authorization to route the UE 402 to the second network node gNB-2 406.

Further, in another example of the selecting a second network node at step 525, after receiving the authorization to route the UE to the second network node, the first network node can route the UE to connect to the second network node. For example, the first network node gNB-1 404 illustrated in FIG. 4 may, after receiving the authorization to route the UE 402 to the second network node gNB-2 406, perform the routing the UE 402 to connect to the second network node gNB-2 406.

In a first embodiment of the selecting a second network node at step 525, the first network node can determine that a plurality of network nodes support the slice requirement of the UE and employing a selection logic to select the second network node to route the UE. For example, the first network node gNB-1 404 illustrated in FIG. 4 may determine that a plurality of network nodes support the slice requirement of the UE 402. In this example, the second network node gNB-2 406 is one of the plurality of network nodes. A selection logic to select the second network node gNB-2 406 to route the UE may be employed. A selectin logic, for example, but not limited to, a priority-based, random-based, or round-robin logic.

In some embodiments, the method includes routing the UE to connect to the second network node at step 530. For example, the first network node gNB-1 404 illustrated in FIG. 4 may route the UE 402 to connect to the second network node gNB-2 406 so that the UE 402 can establish an RRC connection with the second network node gNB-2 406.

FIG. 6 illustrates an example computing system 600 including components in electrical communication with each other using a connection 605 upon which one or more aspects of the present disclosure can be implemented. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

FIG. 7 illustrates an example of a network device 700 (e.g., switch, router, network appliance, etc.) suitable for performing switching, routing, load balancing, and other networking operations. The network device 700 can include a master central processing unit (CPU) 704, interfaces 702, and a bus 710 (e.g., a PCI bus). When acting under the control of appropriate software or firmware, the CPU 704 can be responsible for executing packet management, error detection, and/or routing functions. The CPU 704 preferably accomplishes all these functions under the control of software including an operating system and any appropriate applications software. The CPU 704 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 706 (such as non-volatile RAM and/or ROM) can also form part of the CPU 704. However, there are many different ways in which memory could be coupled to the system.

The interfaces 702 can be provided as interface cards (sometimes referred to as line cards). The interfaces 702 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 702 may also include an independent processor and, in some instances, volatile RAM. The independent processors may control communication intensive tasks such as packet switching, media control, and management. By providing separate processors for the communication intensive tasks, the interfaces 702 may allow the CPU 704 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 706) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    adding, by a first network node, a list of slices that are supported by one or more neighboring nodes to a neighboring relationship table;
    receiving, by a first network node, a Radio Resource Control (RRC) connection request from a user equipment, the RRC connection request including Network Slice Selection Assistance Information (NSSAI);
    determining that a slice requirement of the user equipment is not supported by the first network node;
    selecting a second network node that supports the slice requirement of the user equipment based on a neighboring relationship table of the first network node, comprising:
        querying the neighboring relationship table for a neighboring second network node that supports the slice requirement of the user equipment, wherein a result of the query is the second network node;
        sending a Xn Application Protocol (XnAP) S-node addition request to the second network node requesting an authorization to route the user equipment to the second network node; and
        receiving, at the first network node from the second network node and in response to the sending, an XnAP S-node addition request acknowledgement message; and
    routing the user equipment to connect to the second network node, comprising:
        sending, by a first network node to the user equipment, an RRC reconnection request for the user equipment to reconnect from the first network node to the second network node;
        receiving, by the first network node from the user equipment, an RCC connection complete message; and
        sending, by the first network node to the second network node, a XnAP S-node reconfiguration complete message user equipment can latch on the second network node, the XnAP S-node reconfiguration complete message including identification information of the user equipment and the received NSSAI.

2. The method of claim 1, further comprising:
    adding a list of slices that are supported by one or more neighboring nodes to a neighboring relationship table, wherein the one or more neighboring nodes include the second network node.

3. The method of claim 1, wherein the selecting the second network node that supports the slice requirement of the user equipment comprises:
    querying a neighboring relationship table for a neighboring node that supports the slice requirement of the user equipment, wherein a result of the query is the second network node.

4. The method of claim 1, wherein the selecting the second network node that supports the slice requirement of the user equipment comprises:
    determining that the second network node supports the slice requirement of the user equipment;
    sending a node addition request to the second network node requesting an authorization to route the user equipment to the second network node; and
    after receiving the authorization to route the user equipment to the second network node, performing the routing the user equipment to connect to the second network node.

5. The method of claim 1, wherein the selecting the second network node that supports the slice requirement of the user equipment comprises:
    determining that a plurality of network nodes support the slice requirement of the user equipment, wherein the second network node is one of the plurality of network nodes; and
    employing a selection logic to select the second network node to route the user equipment.

6. The method of claim 1, wherein the first network node maintains a neighboring relationship table identifying one or more neighboring nodes and including an attribute to define an area in which a network slice is available.

7. A system for routing a user equipment to a network node that supports a slice requirement of the user equipment, comprising:
a non-transitory computer readable medium configured to store instructions; and
a processor programmed to execute the instructions and cause the processor to:
add, by a first network node, a list of slices that are supported by one or more neighboring nodes to a neighboring relationship table;
receive, by a first network node, a Radio Resource Control (RRC) connection request from a user equipment, the RRC connection request including Network Slice Selection Assistance Information (NSSAI);
determine that a slice requirement of the user equipment is not supported by the first network node;
select a second network node that supports the slice requirement of the user equipment based on a neighboring relationship table of the first network node, comprising:
querying the neighboring relationship table for a neighboring second network node that supports the slice requirement of the user equipment, wherein a result of the query is the second network node;
sending a Xn Application Protocol (XnAP) S-node addition request to the second network node requesting an authorization to route the user equipment to the second network node; and
receiving, at the first network node from the second network node and in response to the sending, an XnAP S-node addition request acknowledgement message; and
route the user equipment to connect to the second network node, comprising:
sending, by a first network node to the user equipment, an RRC reconnection request for the user equipment to reconnect from the first network node to the second network node;
receiving, by the first network node from the user equipment, an RCC connection complete message; and
sending, by the first network node to the second network node, a XnAP S-node reconfiguration complete message user equipment can latch on the second network node, the XnAP S-node reconfiguration complete message including identification information of the user equipment and the received NSSAI.

8. The system of claim 7, wherein the processor is configured to execute the instructions and further cause the processor to:
add a list of slices that are supported by one or more neighboring nodes to a neighboring relationship table, wherein the one or more neighboring nodes include the second network node.

9. The system of claim 7, wherein the processor is configured to execute the instructions and further cause the processor to:
query a neighboring relationship table for a neighboring node that supports the slice requirement of the user equipment, wherein a result of the query is the second network node.

10. The system of claim 7, wherein the processor is configured to execute the instructions and further cause the processor to:
determine that the second network node supports the slice requirement of the user equipment;
send a node addition request to the second network node request an authorization to route the user equipment to the second network node; and
after receive the authorization to route the user equipment to the second network node, perform the routing the user equipment to connect to the second network node.

11. The system of claim 7, wherein the processor is configured to execute the instructions and further cause the processor to:
determine that a plurality of network nodes support the slice requirement of the user equipment, wherein the second network node is one of the plurality of network nodes; and
employ a selection logic to select the second network node to route the user equipment.

12. The system of claim 7, wherein the first network node maintains a neighboring relationship table identifying one or more neighboring nodes and including an attribute to define an area in which a network slice is available.

13. A non-transitory computer readable medium comprising instructions, the instructions, when executed by a computing system, cause the computing system to perform operations comprising:
add, by a first network node, a list of slices that are supported by one or more neighboring nodes to a neighboring relationship table;
receive, by a first network node, a Radio Resource Control (RRC) connection request from a user equipment, the RRC connection request including Network Slice Selection Assistance Information (NSSAI);
determine that a slice requirement of the user equipment is not supported by the first network node;
select a second network node that supports the slice requirement of the user equipment based on a neighboring relationship table of the first network node, comprising:
querying the neighboring relationship table for a neighboring second network node that supports the slice requirement of the user equipment, wherein a result of the query is the second network node;
sending a Xn Application Protocol (XnAP) S-node addition request to the second network node requesting an authorization to route the user equipment to the second network node; and
receiving, at the first network node from the second network node and in response to the sending, an XnAP S-node addition request acknowledgement message; and
route the user equipment to connect to the second network node, comprising:
sending, by a first network node to the user equipment, an RRC reconnection request for the user equipment to reconnect from the first network node to the second network node;
receiving, by the first network node from the user equipment, an RCC connection complete message; and
sending, by the first network node to the second network node, a XnAP S-node reconfiguration complete message user equipment can latch on the second network node, the XnAP S-node reconfiguration complete message including identification information of the user equipment and the received NSSAI.

14. The computer readable medium of claim 13, wherein the computer readable medium further comprises instructions that, when executed by the computing system, cause the computing system to:

add a list of slices that are supported by one or more neighboring nodes to a neighboring relationship table, wherein the one or more neighboring nodes include the second network node.

15. The computer readable medium of claim 13, wherein the computer readable medium further comprises instructions that, when executed by the computing system, cause the computing system to:

query a neighboring relationship table for a neighboring node that supports the slice requirement of the user equipment, wherein a result of the query is the second network node.

16. The computer readable medium of claim 13, wherein the computer readable medium further comprises instructions that, when executed by the computing system, cause the computing system to:

determine that the second network node supports the slice requirement of the user equipment;

send a node addition request to the second network node request an authorization to route the user equipment to the second network node; and after receive the authorization to route the user equipment to the second network node, perform the routing the user equipment to connect to the second network node.

17. The computer readable medium of claim 13, wherein the computer readable medium further comprises instructions that, when executed by the computing system, cause the computing system to:

determine that a plurality of network nodes support the slice requirement of the user equipment, wherein the second network node is one of the plurality of network nodes; and employ a selection logic to select the second network node to route the user equipment.

18. The computer readable medium of claim 13, the first network node maintains a neighboring relationship table identifying one or more neighboring nodes and including an attribute to define an area in which a network slice is available.

* * * * *